US008028521B2

(12) United States Patent
Boeijen et al.

(10) Patent No.: US 8,028,521 B2
(45) Date of Patent: Oct. 4, 2011

(54) HYDRAULIC CATAPULT DRIVE

(75) Inventors: Sander Leonard Boeijen, Berghem (NL); Marten Fluks, Vianen (NL); Maarten Rik Leo Kuijpers, Gemonde (NL)

(73) Assignee: Bosch Rexroth AG, Stuttgart (DE)

( * ) Notice: Subject to any disclaimer, the term of this patent is extended or adjusted under 35 U.S.C. 154(b) by 854 days.

(21) Appl. No.: 11/912,850

(22) PCT Filed: Feb. 27, 2006

(86) PCT No.: PCT/DE2006/000366
§ 371 (c)(1),
(2), (4) Date: Apr. 2, 2008

(87) PCT Pub. No.: WO2006/114070
PCT Pub. Date: Nov. 2, 2006

(65) Prior Publication Data

US 2009/0100829 A1 Apr. 23, 2009

(30) Foreign Application Priority Data

Apr. 28, 2005 (DE) ........................ 10 2005 020 187
Jan. 20, 2006 (DE) ........................ 10 2006 002 921

(51) Int. Cl.
*B64F 1/06* (2006.01)
*A63G 21/00* (2006.01)

(52) U.S. Cl. ................................ 60/486; 244/63; 104/53

(58) Field of Classification Search .................... 244/63; 104/53; 60/486
See application file for complete search history.

(56) References Cited

U.S. PATENT DOCUMENTS 1,777,167 A * 9/1930 Forbes ............................ 244/63
1,960,264 A 5/1934 Heinkel
2,696,957 A * 12/1954 Brown ............................ 244/63
2,783,004 A * 2/1957 Fieux ............................. 244/63
2,926,871 A * 3/1960 Bless ............................. 244/63
3,534,929 A * 10/1970 Johansen et al. ................ 244/63
6,679,182 B2 * 1/2004 Spieldiener et al. ............ 104/53
6,837,166 B1 * 1/2005 Roodenburg et al. ........... 104/53
7,152,827 B2 * 12/2006 McGeer .......................... 244/63

FOREIGN PATENT DOCUMENTS

WO 0166210 A 9/2001
WO 2004024562 A 3/2004

* cited by examiner

*Primary Examiner* — Thomas E Lazo
(74) *Attorney, Agent, or Firm* — Boyle Fredrickson, S.C.

(57) ABSTRACT

The invention relates to a catapult drive for an object to be accelerated, preferably the car of a fairground ride, wherein the object is accelerated by means of a driving element. The movement of the driving element is produced by a flexible drive and a hydraulic cylinder via which all movements of the driving element can be controlled. The invention also relates to a control system for suitably controlling the inventive catapult drive.

18 Claims, 6 Drawing Sheets

HYDRAULIC CATAPULT DRIVE

BACKGROUND OF THE INVENTION

1. Field of the Invention

The invention relates to a hydraulic catapult drive in accordance with the preamble of claim 1.

2. Description of the Related Art

Hydraulic catapult drives of this type are used for accelerating an object, for instance an aircraft along a launching pad or a passenger train of a roller coaster or the like. In WO 01/66210 A1 a catapult drive is shown by which a car of a fairground ride can be accelerated along an acceleration track. The catapult drive comprises a driving car driven by a hydraulic motor and a flexible drive on which the car to be accelerated is supported. The hydraulic motor drives a winch which is wrapped in opposite sense by two pull ropes both of which act upon the car. Upon acceleration one of the pull means is wound on the winch, while the other pull rope correspondingly unwinds. When resetting the car into its home position the direction of rotation of the hydraulic motor is reversed so that the former pull rope is wound and the latter pull rope is unwound. The flexible drive is tensioned via a tensioning rope of a further flexible drive during acceleration and resetting.

U.S. Pat. No. 6,837,166 B1 discloses a catapult drive for a fairground ride in which the driving element is accelerated via a flexible drive and a hydraulic cylinder by which a movable set of pulleys of the flexible drive is axially movable. In this catapult drive, at the driving element a pull rope of a further flexible drive is additionally fixed the end portions of which similar to the afore-described embodiment—can be wound onto a winch or unwound from the same so that the driving element is reset to the home position by appropriately driving the winch, wherein then also the hydraulic cylinder is returned to its home position by the movable set of pulleys.

In WO 2004/024562 A1 a catapult drive is disclosed in which the acceleration of the driving element takes place via a flexible drive and a hydraulic cylinder in the form of a differential cylinder the bottom-side cylinder chamber of which can be pressurized by the pressure in a high-pressure reservoir when extending the piston rod. The piston rod of the differential cylinder supports two movable sets of pulleys which are wrapped by a common pull rope to which the driving element is fixed. The hydraulic cylinder is reset to its home position via a separate resetting cylinder which is likewise in the form of a differential cylinder and the piston rod of which returns that of the differential cylinder used for acceleration against the force applied by the hydraulic reservoir to its home position.

The above-described catapult drives require a comparatively high expenditure in terms of devices, because for acceleration and resetting of the driving element different actuating members are used which have to be controlled in an appropriate manner.

OBJECT OF THE INVENTION

Compared to this, the object underlying the invention is to provide a simply structured catapult drive via which a driving element acting upon an object to be accelerated is accelerated and can be reset to its home position.

This object is achieved by a hydraulic catapult drive in accordance with the preamble of claim 1.

According to the invention, the hydraulic catapult drive comprises a driving element which can be moved into the direction of acceleration and in the direction of resetting via a flexible drive and a hydraulic cylinder driving the latter. The flexible drive has two sets of pulleys movable by the hydraulic cylinder and wrapped in sections by at least one pull means so that, depending on the control of the hydraulic cylinder, a pulling force for acceleration can be transmitted via a set of pulleys and the pull means and, respectively, a pulling force for resetting can be transmitted via the other set of pulleys. The driving element can be decelerated or accelerated in both directions of movement.

In accordance with the invention, the acceleration and the resetting movement is performed with the aid of a single hydraulic cylinder on which two movable sets of pulleys of the flexible drive are disposed. In contrast to the afore-described prior art—in such a solution no separate drive is required for resetting the driving element so that the expenditure in terms of devices is substantially reduced vis-à-vis these solutions.

In an embodiment of the invention a pull rope which is then deflected at the respective driving element can be allocated to each set of pulleys. Accordingly, in this embodiment at least two pull means or pull ropes act upon the driving element.

In an alternative solution both sets of pulleys of the flexible drive are wrapped by a common pull means to the central portion of which the driving element is fixed.

In both solutions the free ends of the pull rope or ropes are rigidly or movably anchored. Between the end of the pull means and the anchoring a spring element or a clamping cylinder may be arranged to avoid loosening of the pull means and to compensate for variations in length.

When using clamping cylinders, they can be pressurized by the pressure in the respective allocated pressure chamber of the hydraulic cylinder or can be controlled by a separate system.

Depending on the building space available, the movable pulleys and the fixed deflection pulleys of the flexible drive allocated to the former can be arranged approximately in extension of the hydraulic cylinder or laterally with respect the same.

In a particularly preferred embodiment the hydraulic cylinder is an equal area cylinder or has two piston rods of different diameter, wherein one of the sets of pulleys is disposed on each piston rod. It is the advantage of such solution that the piston rods of a cylinder of this type are subjected to tensile load only so that the piston rod is prevented from buckling.

Instead of a cylinder including two piston rods, also a differential cylinder can be used with both sets of pulleys being arranged at the only piston rod thereof. This piston rod then is pressurized in one direction of movement (acceleration or resetting).

In order to avoid excessive loads of the hydraulic drive, the hydraulic cylinder can have an end-of-travel damping integrated in the hydraulic cylinder or formed separately thereof.

The hydraulic cylinder is controlled by a control system, wherein in an embodiment a pressure chamber of the hydraulic cylinder increasing upon acceleration can be connected via the control system to a high-pressure reservoir and/or a high-pressure pump and the pressure chamber of the hydraulic cylinder increasing upon resetting can be connected to a low-pressure reservoir and/or a low-pressure pump.

It is preferred in this context that the high-pressure pump is a variable-displacement pump.

In the control system according to the invention for controlling the hydraulic cylinder in the inlet to the pressure chamber of the hydraulic cylinder increasing upon acceleration and in the discharge from the pressure chamber diminishing upon acceleration a respective proportionally variable control valve is arranged by which the inlet and the discharge can be blocked and/or in response to the accelerating weight an opening cross-section to the hydraulic medium connection of the respective pressure chamber to a hydraulic medium source or a hydraulic medium sink can be increased in a controlled manner.

In an especially preferred embodiment the control system in addition includes a continuously variable resetting control valve by which upon resetting the driving element the increasing pressure chamber of the hydraulic cylinder can be connected to the low-pressure pump and the diminishing pressure chamber can be connected to the hydraulic medium sink. Since this resetting movement is comparatively slow, the continuously variable resetting valve can be designed to have a lower nominal size than the afore-mentioned proportionally variable control valves.

In an advantageous solution the control system includes a check valve by which a hydraulic medium flow path from the discharge to the pressure chamber increasing upon acceleration can be increased in a controlled manner upon deceleration of the driving element after the accelerating phase, wherein the allocated proportionally variable control valve is by-passed. It is possible in this way to move said control valve for deceleration into a closing position and to allow hydraulic medium to flow from the discharge into the allocated pressure chamber.

In a further preferred solution between each control valve and the allocated pressure chamber a respective pilot-controlled logic valve which permits a leak-free sealing of the pressure chambers is disposed in the hydraulic medium flow path.

The hydraulic cylinder is preferably arranged in an open hydraulic circuit.

The applicant reserves itself to direct a separate independent claim to the control system per se comprising the proportionally variable directional control valves, the check valve, the additional continuously variable reset control valve and/or the other component parts, wherein said hydraulic component parts can be claimed in any combination and independently of the structure of the gear arranged between the driving element and the hydraulic cylinder.

Hereinafter preferred embodiments of the invention are illustrated in detail by way of schematic drawings, in which

DETAILED DESCRIPTION OF THE PREFERRED EMBODIMENT

Figure 1:
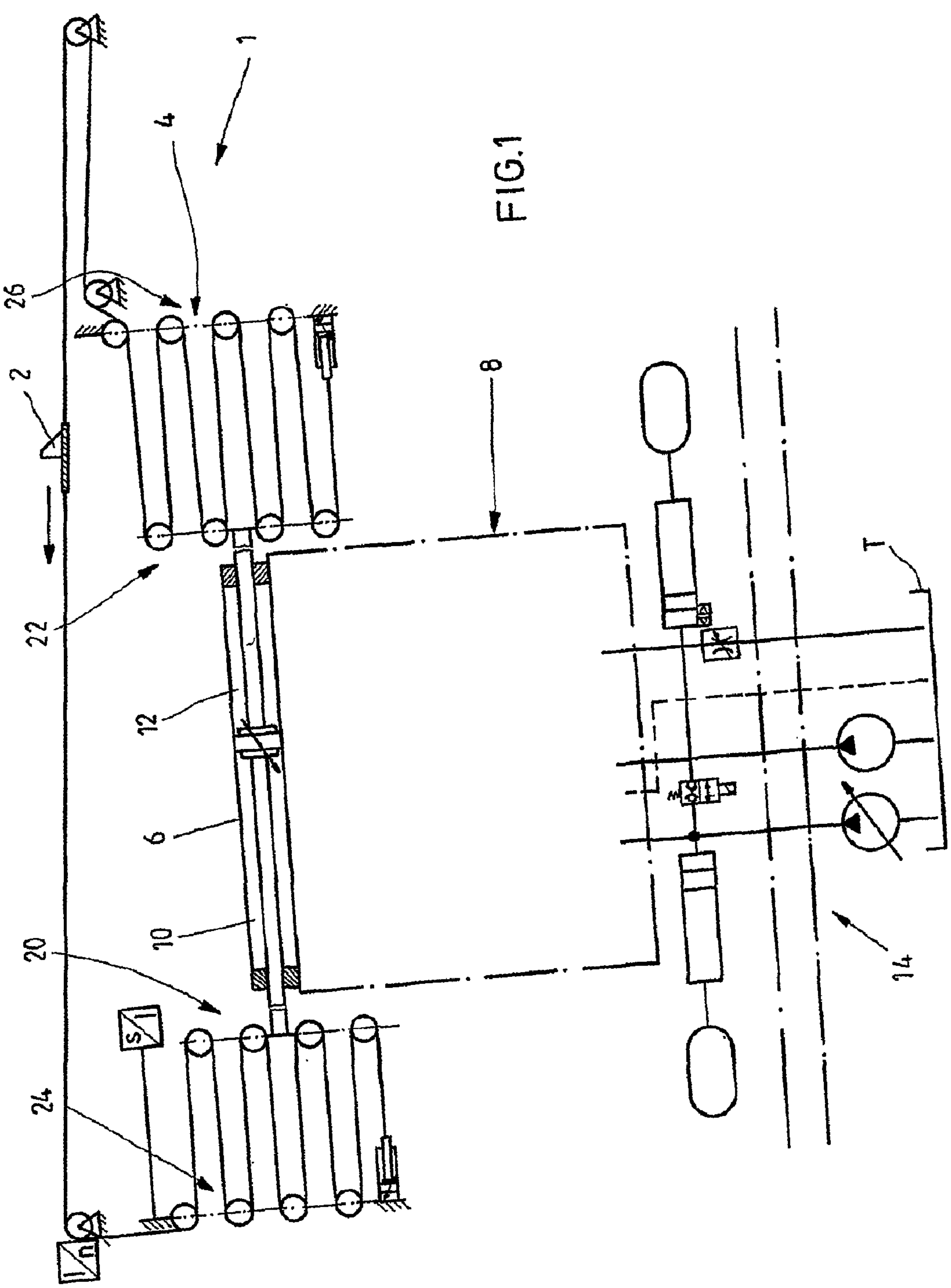
FIG. 1 shows a circuit diagram of a first embodiment of a catapult drive for a roller coaster.

FIG. 1 shows a circuit diagram of a hydraulic catapult drive 1 for a car or a passenger train of a roller coaster or the like. Said car is accelerated via a driving element 2 driven by the catapult drive 1. In the shown embodiment a flexible drive 4 which is driven by a hydraulic cylinder 6 acts upon both sides of the driving element 2. The hydraulic cylinder is an equal area cylinder in the shown embodiment. The hydraulic medium supply of the hydraulic cylinder 6 takes place via a control system 8 by which two pressure chambers 10, 12 of the hydraulic cylinder 6 can be communicated with a hydraulic medium source 14 or a hydraulic medium sink formed by a tank T in the shown embodiment. The control system 8 is in the form of an open circuit. Further details of the catapult drive will be illustrated hereinafter by way of the enlarged views in FIGS. 2 and 3.

Figure 2:
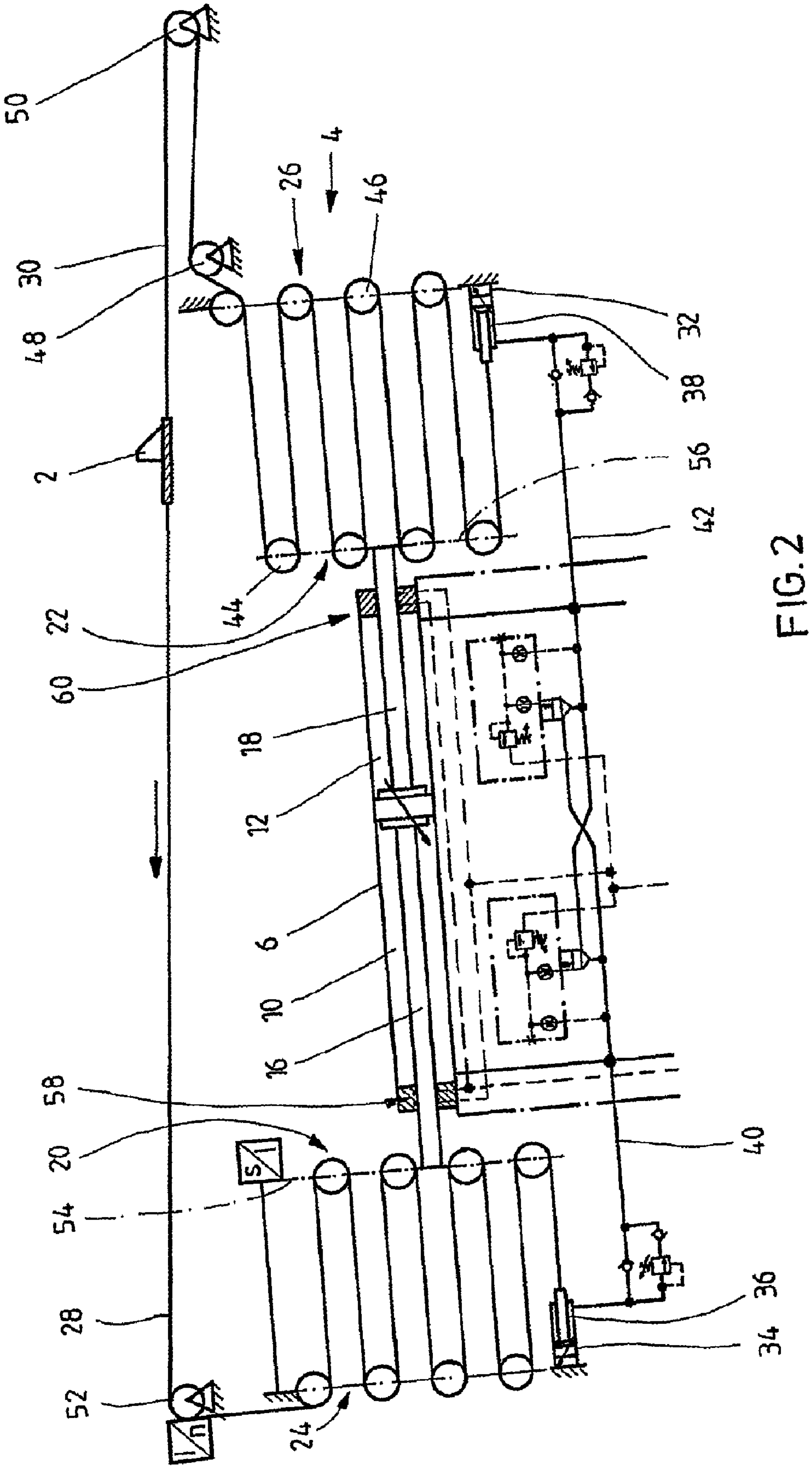
FIG. 2 is a partial view of a flexible drive of the catapult drive from FIG. 1.

FIG. 2 shows the flexible drive 4 including the hydraulic cylinder 6 for moving the driving element 2, the latter being moved in the direction of the arrow for acceleration and is reset in the opposite direction. As mentioned in the foregoing, the hydraulic cylinder 6 is a an equal area cylinder in this embodiment by the pistons of which including the two piston rods 16, 18 the cylinder is divided into the two pressure chambers 10, 12 which are designed as respective annular chambers. For accelerating the driving element 2 the piston is moved to the right in the view according to FIG. 1 so that the pressure chamber 10 is increased, while the pressure chamber 12 located on the right (FIG. 2) is correspondingly reduced. In the shown embodiment the diameters of the piston rods 16, 18 are equal. On principle, they may also have different diameters.

At the end portions of the piston rods 16, 18 protruding from the hydraulic cylinder 6 a respective movable set of pulleys 20 and 22 of the flexible drive 4 is mounted which is appropriately displaceable by the in and out travel movement of the piston rods 16, 18. A set of deflection pulleys 24 and/or 26 is allocated to each set of pulleys 20, 22. Each of said sets of deflection pulleys 24, 26 is supported in a stationary manner on the frame of the roller coaster or on a base.

The sets of pulleys 22, 26 and 20, 24 allocated to each other are wrapped by a respective pull means, for instance a pull rope 28, 30 acting with an end portion upon the driving element 2 so that via the pull rope 28 the driving element 2 is moved in the direction of acceleration, while resetting is performed by means of the pull rope 30. There can also be used one single continuous pull rope 28, wherein in that case the driving element 2 is detachably fixed to the same. The pull rope 28 can then be pulled through the driving element 2 so that an exchange of the rope is simplified.

The respective other end portions of the two pull ropes 28, 30 are anchored in turn at the frame/base. In the shown embodiment they are anchored via a respective clamping cylinder 32, 34 in the form of a differential cylinder. By said clamping cylinders 32, 34 variations of length of the pull ropes 28, 30 can be compensated and a continuous tension can be adjusted. The clamping cylinder 32, 34 has an annular chamber 38 and/or 36 connected via a clamping line 40 and/or 42 to the respective adjacent pressure chamber 10 (clamping line 40) and/or 12 (clamping line 42). In this way it is ensured that the pull rope 28, 30 exerting a pulling force on the driving element 2 upon acceleration or resetting is tensioned by the respective pressure in the correspondingly increasing pressure chamber 10, 12.

Of course, also other clamping members, for instance pneumatic clamping cylinders, clamping springs etc. can be employed. Basically also a "rigid" but adjustable anchoring of the respective pull rope is possible.

A respective block and tackle is formed by the pull ropes 28, 30 and the two sets of pulleys 22, 26; 20, 24 wrapped by the same. In the shown embodiment each of the two movable sets of pulleys 20, 22 includes 4 rope pulleys 44 and the fixed sets of pulleys 24, 26 include 4 rope pulleys 46 so that accordingly an eightfold pulley ratio is provided. Consequently, the stroke of the piston rods 16, 18 is transmitted via the flexible drive 4 such that the driving element 2 covers the eightfold distance along the track of motion. Accordingly, the pulling force transmitted from the driving element 2 to the car to be accelerated is merely ⅛ of the force applied by the hydraulic cylinder 6.

In the shown embodiment between the driving element 2 and the set of deflection pulleys 26 two further stationary guide pulleys 48, 50 are provided by which the pull rope 30 is aligned with respect to the track of motion of the driving element 2. In the pull rope 28 active in the direction of acceleration merely one stationary guide pulley 52 is provided. The movable sets of pulleys 20, 22 can be guided or supported in an appropriate manner.

In the shown embodiment the movable sets of pulleys 22, 20 are supported on a joint cross-beam 54 and/or 56 indicated in dash-dot line which in turn is fixed to the respective allocated piston rod 16 and/or 18. Of course, the pulleys 44 of the movable sets of pulleys 20, 22 can also be arranged to be coaxially juxtaposed, wherein the deflection pulleys 46 are then correspondingly aligned.

For accelerating the driving element 2 the piston of the hydraulic cylinder 6 is moved to the right so that, accordingly, the movable set of pulleys 20 is likewise shifted to the right and the distance between the movable set of pulleys 20 and the set of deflection pulleys 24 is increased and, accordingly, the driving element 2 is accelerated in arrow direction. Also the movable set of pulleys 44 is shifted to the right toward the set of deflection pulleys 26, the pull rope 30 also moving via the moving driving element 2 and being kept tensioned by the cylinder 32.

In the represented embodiment the piston rods 16, 18 are supported by a hydrostatic bearing 58, 60 in the bottom of the cylinder 6. As hydrostatic bearings of this type are known to those skilled in the art, respective explanations can be dispensed with. The hydraulic cylinder 6 is preferably also designed to include end-of-travel damping means that are either integrated in the hydraulic cylinder 6 or are externally arranged.

In the solution shown in FIG. 2 all necessary movements of the driving element 2 are controlled via the hydraulic cylinder 6—the catapult drive 1 thus has a substantially simpler design than the prior art described in the beginning.

Figure 3:
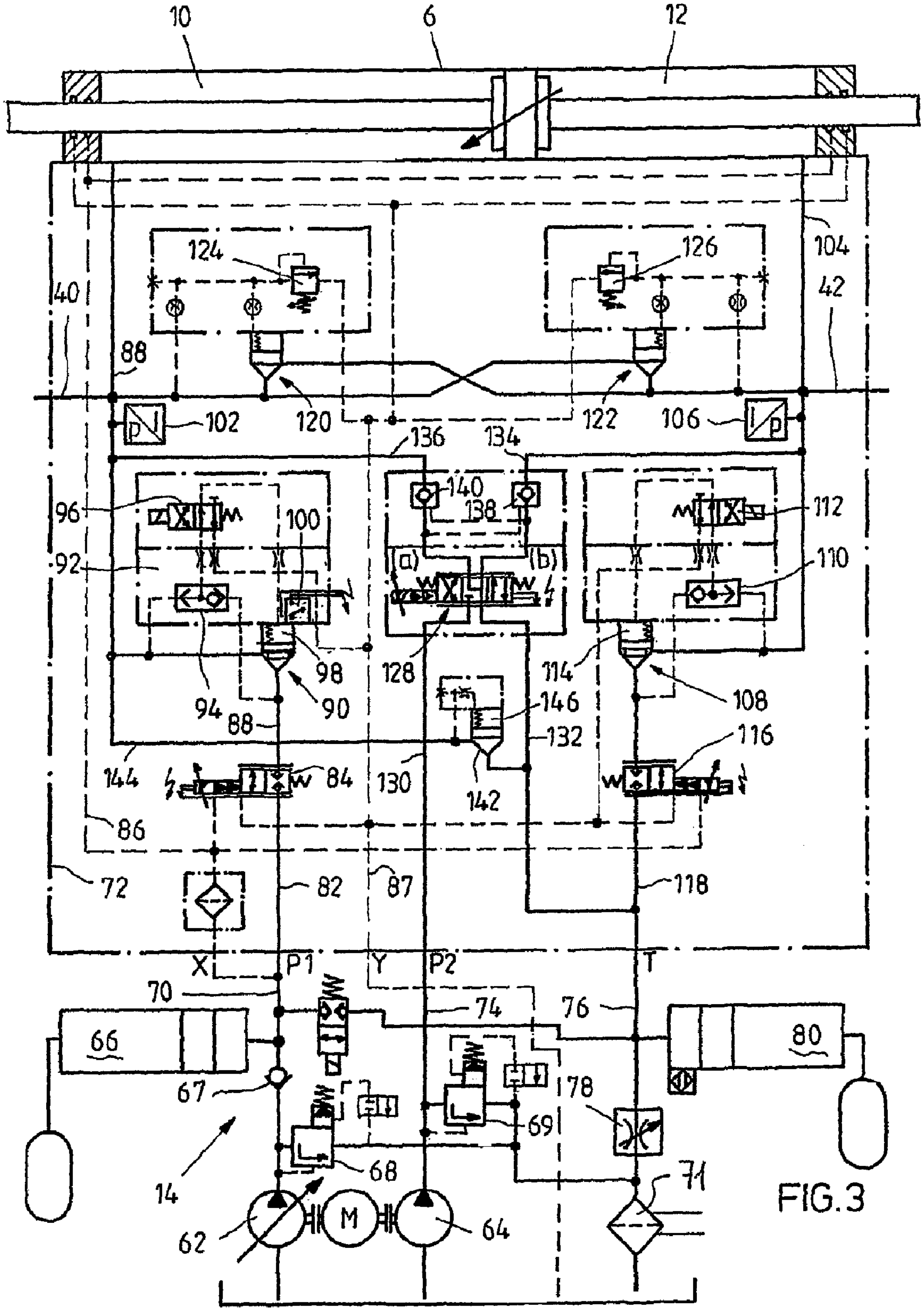
FIG. 3 is a partial view of a hydraulic control system of the catapult drive from FIG. 1.

The control of the hydraulic cylinder 6 is explained by way of FIG. 3 illustrating a circuit diagram of the control system 8 of the hydraulic cylinder 6.

Figure 4:
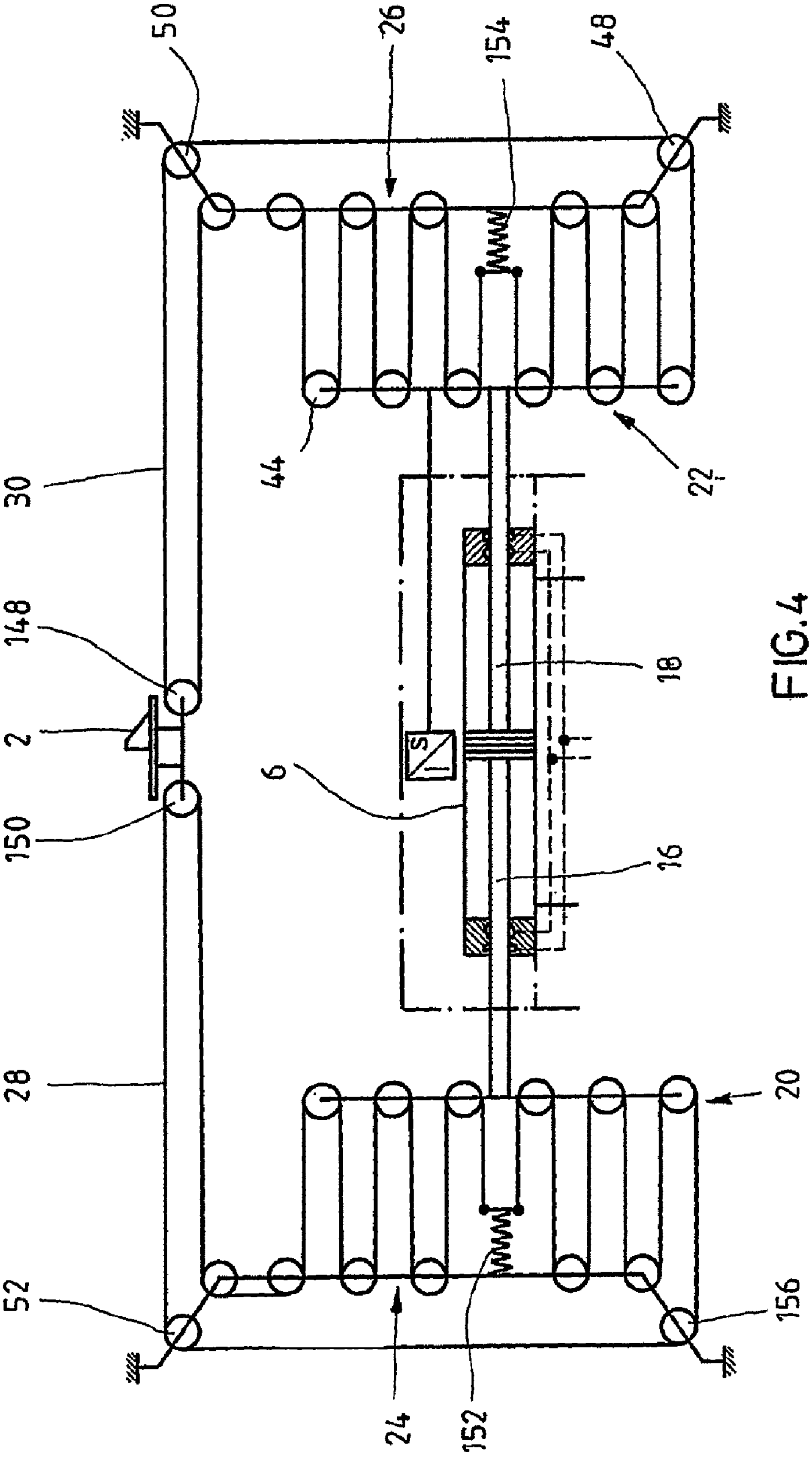
FIG. 4 shows a variant of the flexible drive from FIG. 1.

In the embodiment according to FIG. 1, as can be taken in detail from FIG. 4, the hydraulic medium source 14 is formed by a pump system comprising a variable-displacement pump 62, a constant-displacement pump 64 and a high-pressure reservoir 66. The constant-displacement pump 64 and the variable-displacement pump 62 are preferably driven by a joint motor M. A check valve 67 is arranged downstream of the pressure port of the constant-displacement pump 64. Moreover, a pilot-controlled pressure-limiting valve 68 and/or 69 including directional control valve relief is connected to each pressure port. The pressure ports of the variable-displacement pump 62 and of the high-pressure reservoir 66 are connected via a high-pressure pump line 70 to a pressure port P1 of a control block 72 accommodating the control system 8 (indicated in dash-dot line). The pressure port of the constant-displacement pump 64 is connected to a further pressure port P2 of the control block 72 via a low-pressure pump line 74. The control block further comprises a tank port T connected to the tank T via a tank line 76 and a back-flow valve 78. According to FIG. 3, a cooler 71 can further be provided in the tank line 76. In the area between the tank port T and the back-flow valve 78 a low-pressure hydraulic reservoir 80 is connected by which pressure variations in the tank line 76 can be compensated. The back-flow valve 78 ensures that the tank line 76 is somewhat biased.

Moreover, at the control block 72 a control port X and an oil-leakage port Y are provided, the latter being connected to the tank T. In the shown embodiment the control port X is connected to the high-pressure pump line 70 so that the pressure prevailing there acts as control pressure. Basically, also an external control pressure can be supplied.

Inside the control block 72 the pressure port P1 is connected via a supply line 82 to the input port A of a proportionally variable control valve 84 hereinafter referred to as acceleration control valve 84. It is electro-hydraulically pilot-controlled, wherein the control pressure is tapped off the control port X via a control line 86. The leakage oil can flow off via an oil-leakage line 87 to the oil-leakage port Y. Said acceleration control valve 84 can be in the form of a pilot-controlled proportionally variable logic valve, for example. A port B of the acceleration control valve 84 is connected to the pressure chamber 10 of the hydraulic cylinder 6 via an advance line 88 and a logic valve 90. In its spring-biased home position the acceleration control valve 84 seals the hydraulic medium communication to the advance line 88 in a leak-proof manner. A supply metering orifice defining the hydraulic medium volume flow is increased in a controlled manner by appropriately controlling the acceleration control valve 84.

The logic valve 90 disposed in the advance line 88 is likewise designed to be pilot-controlled, wherein in a cover 92 of the logic valve 90 a shuttle valve 94 is arranged the two inputs of which are pressurized by the pressures at the port A and/or at the port B of the logic valve 90 so that the respective higher pressure is transmitted. The output of the shuttle valve 94 is connected to the input of a pilot valve 96. It is in the form of a 4/2 directional switch valve and connects in its spring-biased home position the output of the shuttle valve 94 to the spring chamber 98 of the logic valve 90 so that the latter is biased in closing position and blocks the hydraulic medium flow path toward the annular chamber 10. Upon change-over of the pilot valve 96 the spring chamber 98 is connected to the control oil tank line 97 so that the spring chamber 98 is pressure-relieved and can open the logic valve 90. The opening movement of the piston of the logic valve 90 can be detected by a limit switch 100. In this switching position of the pilot valve 96 moreover the connection from the output of the shuttle valve 94 to the spring chamber 98 of the logic valve 90 is blocked. The pressure prevailing in the advance line 88 is detected via a pressure sensor 102.

A discharge line 104 whose pressure can be detected via a further pressure sensor 106 and in which a further logic valve 108 is provided having practically the same structure as the logic valve 90 is connected to the pressure chamber 12 of the hydraulic cylinder 6. I.e. the higher pressure at the ports A, B of the logic valve 108 is tapped off by a shuttle valve 110 and is reported to a spring chamber 114 of the logic valve 108 in a home position of a pilot valve 112. By change-over of the pilot valve 112 the spring chamber 114 is connected to the control oil tank line 87 and is thus pressure-relieved so that the logic valve 108 can be opened by the pressure applied to the pressure port B or A. The port A of the logic valve 108 is connected to an output port B of a further continuously variable control valve, hereinafter referred to as discharge control valve 116 the structure of which is similar to that of the acceleration control valve 84 so that further explanations can be dispensed with. A discharge line 118 leading to the tank port T is connected to the port A of the discharge control valve 116.

In order to avoid pressure excesses in the advance line 88 and/or in the return line 104 they can be connected to each other via two pilot-controlled pressure-limiting valves 120, 122, wherein the maximum pressure is produced by appropriate adjustment of a pilot valve 124, 126.

In the control system shown in FIG. 3 the resetting motion of the driving element, i.e. the axial displacement of the piston of the hydraulic cylinder 6 to the left is performed with the aid of a continuously variable reset control valve 128. It has four ports, wherein a pressure port P is connected via a reset line 130 to the second pressure port P2 of the control block 72 and a tank port T is connected via a reset tank line 132 to the discharge line 118. Two working ports A, B are connected via a reset advance line 134 to the return line 104 and via a reset return line 136 to the advance line 88, the valves 84, 116; 90, 108 being by-passed. In each of the lines 134, 136 a respective releasable check valve 138, 140 is provided. In its spring-biased home position the reset control valve 128 connects its two working ports A, B to the reset tank line 182, the check valves 138, 140 blocking a hydraulic medium flow from the return line 104 or from the advance line 88 to the working ports A, B of the reset control valve 128. By an appropriate pilot-control of the reset control valve 128 the same is shifted into one of its positions marked by (a) in which the pressure port P is connected to the working port B and the working port A is connected to the tank port T so that hydraulic medium is conveyed from the constant-displacement pump 64 through the low-pressure pump line 74, the reset line 130, the reset advance line 134, the return line 104 into the pressure chamber 12 and, accordingly, the hydraulic medium displaced from the pressure chamber 10 flows through the advance line 88, the reset return line 136, the opened stop valve 140, the working port A, the discharge line 118, the tank line 76 and the backflow valve 78 to the tank T, the tank line 76 being biased via the backflow valve 78.

By shifting the reset control valve 128 to one of its positions marked by (b) the hydraulic cylinder 6 can be adjusted also in the direction of acceleration via the constant-displacement pump 64.

The shown control system 8 moreover comprises a check valve 142 disposed in a filling line 144 connecting the reset tank line 132 to the advance line 88. Said check valve 142 is likewise in the form of a logic valve in the represented embodiment, wherein the pressure prevailing in the advance line 88 is reported to its spring chamber 146.

For the purpose of a better comprehension, the function of the control system shown in FIG. 3 is illustrated by way of the different phases of motion of the driving element 2.

For accelerating the driving element 2 the acceleration control valve 84 and the discharge control valve 116 are opened in a controlled manner, wherein the increased cross-section may vary in response to the weight of the passenger car due to the number of passengers so as to adjust a predetermined acceleration profile. The variable-displacement pump 62 is driven by the motor M and hydraulic medium is conveyed into the high-pressure pump line 70. The two pilot valves 96 and 112 of the logic valves 90, 108 are changed over so that the hydraulic medium is conveyed via the opening logic valve 90 and the advance line 88 into the pressure chamber 10 so that the piston of the hydraulic cylinder 6 is moved to the right and—as explained in the beginning—the driving element 2 is accelerated by the pull rope 28 in the direction of the arrow (FIG. 1) by the increase in the distance between the movable set of pulleys 20 and the allocated set of deflection pulleys 24 so as to set the car to its initial speed. The hydraulic medium from the decreasing annular chamber 12 flows via the return line 104 to the logic valve 108, wherein the pressure in the return line 104 acts upon the annular surface of the piston of the logic valve 108 and moves the same to its opening position so that the hydraulic medium flows off toward the tank T via the increased discharge control valve 116, the discharge line 118, the tank line 76 and the backflow valve 78. The control valves 84, 116 are driven such that the desired speed or acceleration profile is brought about.

At the end of the accelerating phase the driving element 2 is decelerated. For this purpose, the acceleration control valve 84 is closed and the discharge control valve 116 is closed in a controlled manner so that a predetermined decelerating speed profile is observed. The speed of the piston of the hydraulic cylinder 6 is adequately reduced, the volume of the pressure chamber 10 (accelerating pressure chamber) being further increased—the amount of hydraulic medium required for filling said pressure chamber 10 can then flow in through the opening check valve 142 from the discharge line 118 so that the filling takes place in the decelerating phase despite a closed or almost closed acceleration control valve 84. The energy consumption from the high-pressure reservoir 66 is minimal by this measure.

Upon standstill of the hydraulic cylinder 6 then both valves 84, 116 are closed and the check valve 142 is in its closing position again. The high-pressure reservoir 66 is thus separated from the hydraulic cylinder 6. The driving element 6 is then reset in the afore-described manner by adjusting the reset control valve 128 into one of its positions marked by (a), the hydraulic medium required for resetting being supplied by the constant-displacement pump 64 which is now driven by the common motor. During said return motion comparatively low pressures occur in the system, the motion is moreover relatively slow so that the reset control valve 128 can be designed to have a comparatively small nominal size. During the decelerating phase, the resetting motion and the standstill of the hydraulic cylinder 6 the hydraulic reservoir 66 can be charged relatively slowly via the variable-displacement pump 62, because sufficient time is available. During the waiting period to the next acceleration of the driving element 2 the driving side of the control system is practically unloaded so that no separate locking means is necessary.

In the embodiment shown in FIG. 4 the flexible drive 4 is designed to have two pull ropes 28, 30, wherein two additional deflection pulleys 148, 150 serving for deflecting a respective one of the pull ropes 28 or 30 are provided at the driving element 2. This facilitates exchange of the pull ropes 28 or 30, because they have no longer to be detached from the driving element 2. In this embodiment each of the two movable sets of pulleys 20, 22 is designed to have six pulleys 44 so that accordingly a six-fold transmission ratio is formed. The respective allocated set of deflection pulleys 24, 26 is correspondingly designed, wherein the pull rope is guided such that the piston rod 18 is symmetrically loaded and that the two end portions of the pull ropes 28, 30 end in the respective axial area of the piston rod 16, 18. The two end portions of each pull rope 28, 30 are then anchored in this embodiment by a tension spring 152, 154 by which the pull ropes 28, 30 are kept tensioned. The tension springs 152, 154 are designed such that they are adapted to transmit the necessary pulling forces to accelerate the driving element 2. The rope is guided by additional stationary guide pulleys 48, 50, 52 and 156.

Figure 5:
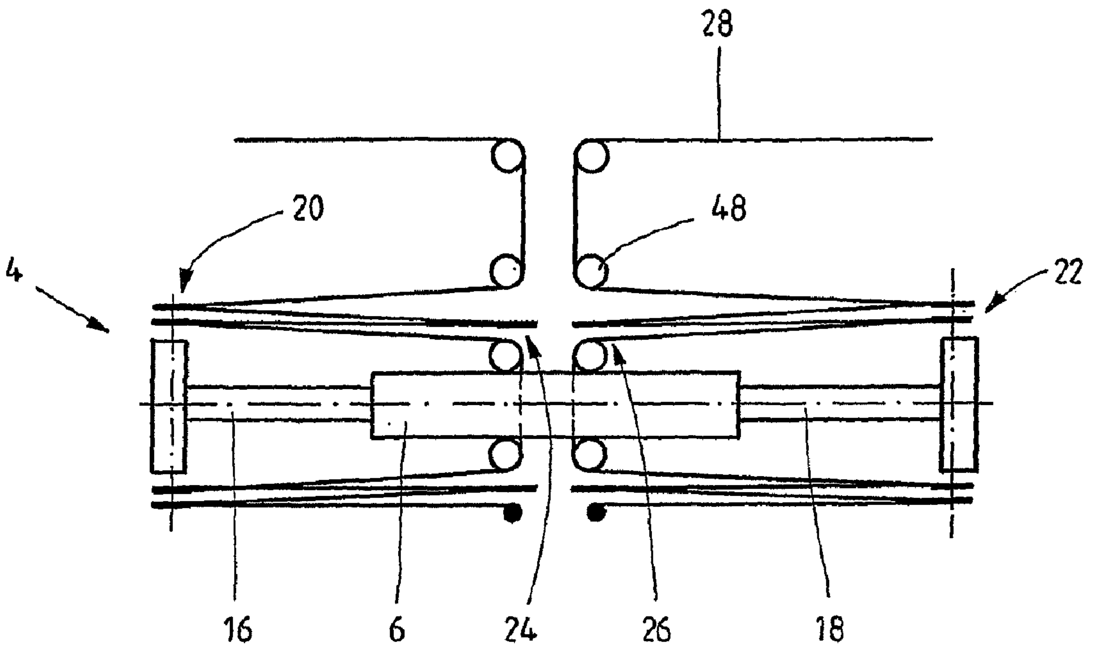
FIG. 5 is a further variant of the flexible drive from FIG. 1.
Figure 6:
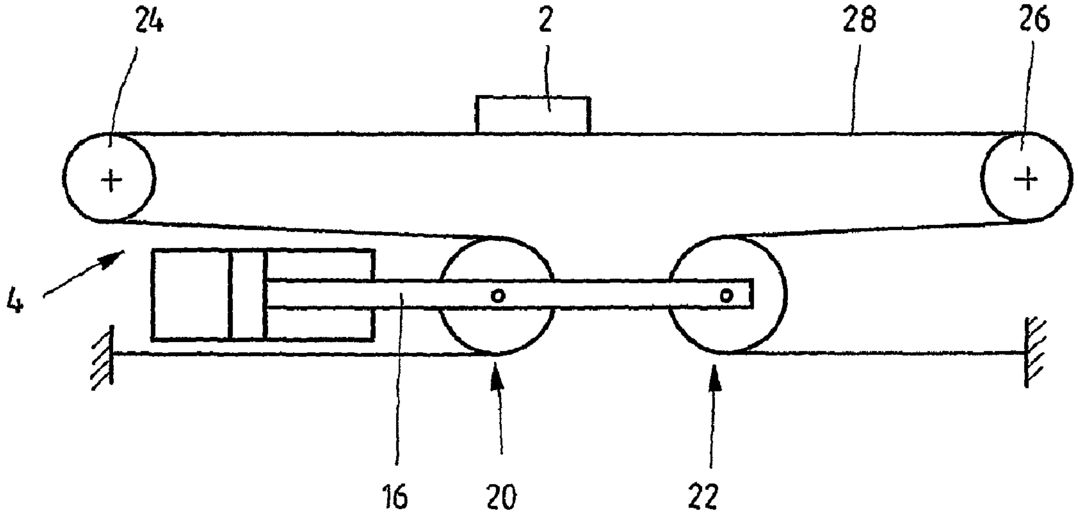
FIG. 6 shows a further embodiment of a flexible drive which can be controlled via a control system according to FIG. 1 (3) and FIG. 7 shows a control system in minimum configuration.

In the above-described embodiments the flexible drive 4 is designed such that the movable set of pulleys 20, 22 and the stationary set of deflection pulleys 24, 26 are disposed in extension of the hydraulic cylinder 6 so that a comparatively large building space is required in axial direction. As shown in FIG. 5, the rope guiding of the flexible drive 4 can also be such that the rope is guided laterally from the hydraulic cylinder 6. The movable set of pulleys 20, 22 is fixed—similar to the afore-described embodiment—at a respective end of the allocated piston rod 16 and/or 18, the individual pulleys 44 being arranged coaxially with respect to each other and being represented in top view. The two allocated sets of deflection pulleys 24, 26 are then inwardly offset toward each other so that they are located on both sides of the cylinder jacket. The stationary deflection pulleys 24, 26 can be supported on the cylinder or on the frame of the roller coaster. The two end portions of the—in this case—common pull rope 28 are in turn anchored in a stationary manner. The pull rope 28 is then guided via further guide pulleys 48 to the driving element 2 (not shown) and the latter is fixed to the pull rope 28. Of course, a pull rope guiding of this type can also be performed with two pull ropes.

In the afore-described embodiments a hydraulic cylinder 6 is used comprising two piston rods 16, 18 which preferably have the same diameter. On principle, instead of such an equal area cylinder also a differential cylinder having one single piston rod 16, to which then the movable sets of pulleys 20, 22 are fixed, can be employed. The two sets of deflection pulleys 24, 26 are in turn supported in a stationary manner. The pulley arrangement is wrapped by a common pull rope 28 to which the driving element 2 is fixed. As a matter of fact, instead of the single pull rope 28 wrapping the entire flexible drive 4 also a variant having two separate pull ropes 28, 30 according to FIG. 4 can be used.

Figure 7:
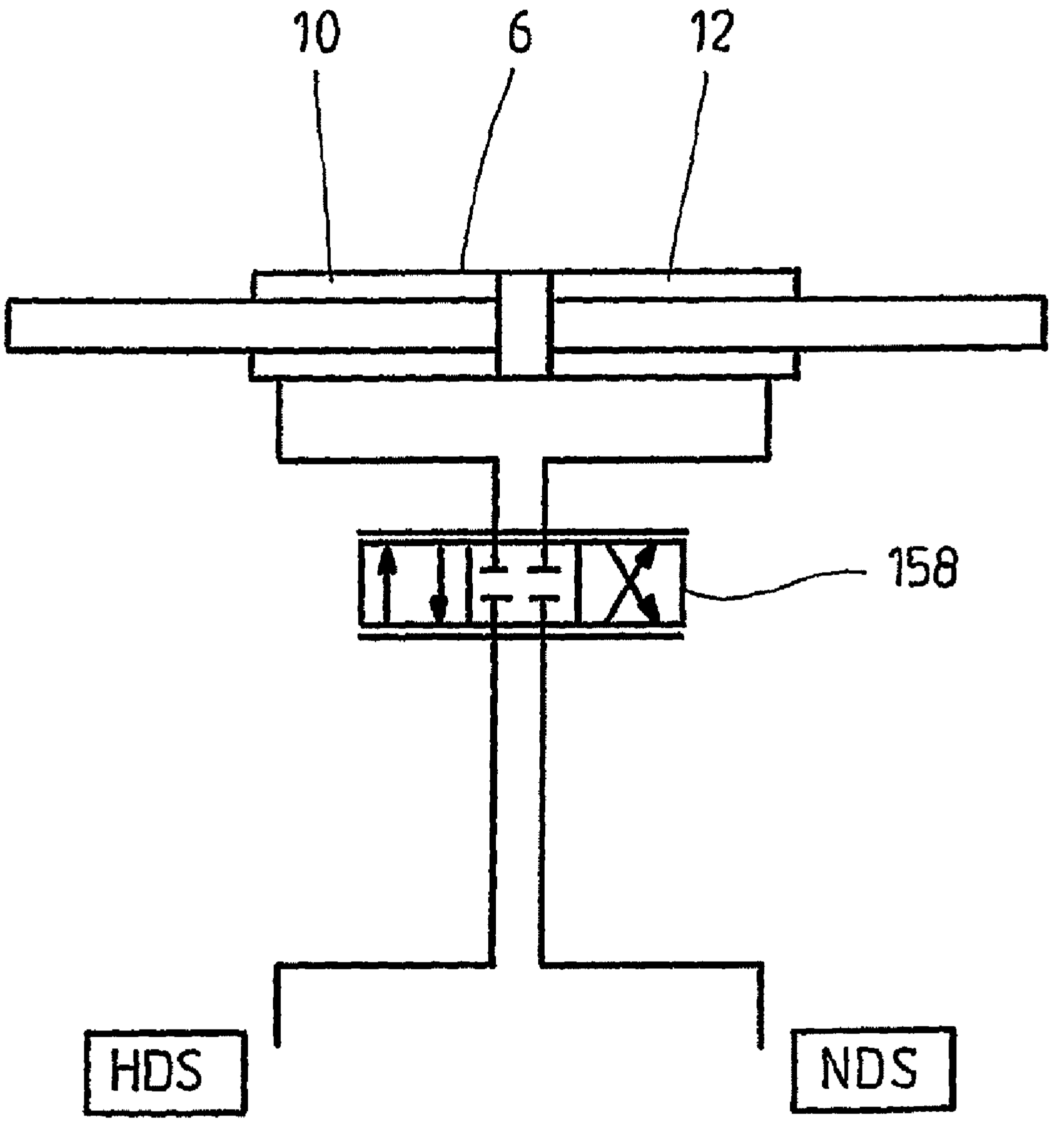

The control system illustrated especially by way of FIG. 3 permits operation of a roller coaster with minimum losses of energy, wherein the control system need not necessarily be designed in the shown complex manner, however. In FIG. 7 the minimum requirements to said control system are represented. Accordingly, the flexible drive 4 not shown is actuated by a hydraulic cylinder 6 (equal area cylinder, cylinder including two piston rods, differential cylinder) by which all movements of the driving element 2 are controlled. The two pressure chambers 10, 12 of the hydraulic cylinder 6 in the simplest case can be connected via a control valve system 158 to a high-pressure side HDS and/or a low-pressure side NDS. The term high-pressure side HDS is understood to be, for instance, a high-pressure reservoir 66 and a high-pressure pump (variable-displacement pump 62). The term low-pressure side NDS basically stands for the return side to the tank T. In this area a low-pressure reservoir may be provided to compensate for pressure variations. The control valve system 158 may be designed by one or more control valves.

As mentioned already, the applicant reserves itself to direct a separate independent set of claims to the principle of said control system comprising the component parts shown in FIG. 7 or the further embodiments according to FIG. 3.

There is disclosed a catapult drive for an object to the accelerated, preferably the car of a fairground ride, wherein the object is accelerated by means of a driving element. The movement of the driving element is produced by a flexible drive and a hydraulic cylinder via which all movements of the driving element can be controlled. There is further disclosed a control system for suitably controlling the inventive catapult drive.

The invention claimed is:

1. A hydraulic catapult drive for accelerating an object comprising a driving element acting upon an object for acceleration and being movable along a motion track, the driving element being movable via a flexible drive and a hydraulic cylinder driving the latter in the direction of acceleration or in the resetting direction, wherein at least one pressure chamber of the hydraulic cylinder can be connected via a control system to a hydraulic medium source or a hydraulic medium sink (T), and wherein the flexible drive has two movable sets of pulleys wrapped in portions by at least one pull means, wherein, depending on the control of the hydraulic cylinder a pulling force can be transmitted to the driving element via one of the sets of pulleys and the pull means for accelerating, and via the other of the sets of pulleys and the pull means for resetting, wherein the hydraulic cylinder is a) an equal area cylinder or b) has two piston rods of different diameter, with respective ones of the sets of pulleys being disposed on corresponding ones of the piston rods.

2. A catapult drive according to claim 1, wherein a pull means deflected by the respective driving element is allocated to each set of pulleys.

3. A catapult drive according to claim 2, wherein free end portions of the pull means are anchored rigidly.

4. A catapult drive according to claim 3, wherein a spring element is disposed between the end of the pull means and the free end portions.

5. A catapult drive according claim 3, wherein a clamping cylinder is disposed between the end of the pull means and the free end portions.

6. A catapult drive according to claim 1, wherein both movable sets of pulleys are wrapped by a common pull means to the central area of which the driving element is fixed.

7. A catapult drive according to claim 1, wherein sets of deflection pulleys allocated to the movable sets of pulleys are arranged approximately in an extension of the hydraulic cylinder or laterally with respect to the same.

8. A catapult drive according to claim 1, wherein the hydraulic cylinder is a differential cylinder the piston rod of which supports both movable sets of pulleys.

9. A catapult drive according to claim 1, further comprising an end-of-travel damping of the hydraulic cylinder.

10. A catapult drive according to claim 1, wherein a pressure chamber of the hydraulic cylinder being increased upon acceleration is connected via the control system to a high-pressure reservoir and/or to a high-pressure pump and the pressure chamber of the hydraulic cylinder being increased upon resetting is connected to a low-pressure source and/or a low-pressure pump.

11. A catapult drive according to claim 10, wherein the high-pressure pump is a variable-displacement pump and the low-pressure pump is a constant-displacement pump.

12. A catapult drive according to claim 10, wherein the control system comprises a continuously variable reset control valve by which upon reset of the driving element the increasing pressure chamber of the hydraulic cylinder can be connected to a low-pressure pump and the decreasing pressure chamber can be connected to the hydraulic medium sink (T).

13. A catapult drive according to claim 10, further comprising a check valve by which, upon deceleration of the driving element, a hydraulic medium flow path can be opened in a controlled manner from the discharge to the pressure chamber the flow path being increased during acceleration while by-passing the continuously variable control valve arranged in the supply line.

14. A catapult drive according to claim 10, wherein between each pressure chamber and the allocated continuously variable control valve a pilot-controlled logic valve is disposed.

15. A catapult drive according to claim 1, wherein the hydraulic cylinder is arranged in an open circuit.

16. A catapult drive according to claim 1, wherein the object is a car of a roller coaster.

17. A hydraulic catapult drive for accelerating an object comprising a driving element acting upon an object for acceleration and being movable along a motion track, the driving element being movable via a flexible drive and a hydraulic cylinder driving the latter in the direction of acceleration or in the resetting direction, wherein at least one pressure chamber of the hydraulic cylinder can be connected via a control system to a hydraulic medium source or a hydraulic medium sink (T), and wherein the flexible drive has two movable sets of pulleys wrapped in portions by at least one pull means, wherein, depending on the control of the hydraulic cylinder a pulling force can be transmitted to the driving element via one of the sets of pulleys and the pull means for accelerating, and via the other of the sets of pulleys and the pull means for resetting, and wherein a pull means deflected by the respective driving element is allocated to each set of pulleys, and wherein free end portions of the pull means are anchored rigidly, and wherein a clamping cylinder is disposed between the end of the pull means and the free end portions, and wherein pressure prevailing in the allocated pressure chamber of the hydraulic cylinder is applied to the respective clamping cylinders.

18. A hydraulic catapult drive for accelerating an object comprising a driving element acting upon an object for acceleration and being movable along a motion track, the driving element being movable via a flexible drive and a hydraulic cylinder driving the latter in the direction of acceleration or in the resetting direction, wherein at least one pressure chamber of the hydraulic cylinder can be connected via a control system to a hydraulic medium source or a hydraulic medium sink (T), and wherein the flexible drive has two movable sets of pulleys wrapped in portions by at least one pull means, wherein, depending on the control of the hydraulic cylinder a pulling force can be transmitted to the driving element via one of the sets of pulleys and the pull means for accelerating, and via the other of the sets of pulleys and the pull means for resetting, and wherein a pressure chamber of the hydraulic cylinder being increased upon acceleration is connected via the control system to a high-pressure reservoir and/or to a high-pressure pump and the pressure chamber of the hydraulic cylinder being increased upon resetting is connected to a low-pressure source and/or a low-pressure pump, and wherein in the supply to the pressure chamber being increased upon acceleration and in the discharge from the decreasing pressure chamber a respective proportionally variable control valve is arranged by which the supply and the discharge is blocked or an opening cross-section for hydraulic medium connection of the respective pressure chamber to the hydraulic medium source or the hydraulic medium sink is opened in a controlled manner.

* * * * *